Feb. 24, 1959     J. A. PELLETIER     2,874,649
PROCESS FOR PRODUCING CANDIES WITH INSET DESIGNS
Filed Dec. 17, 1956
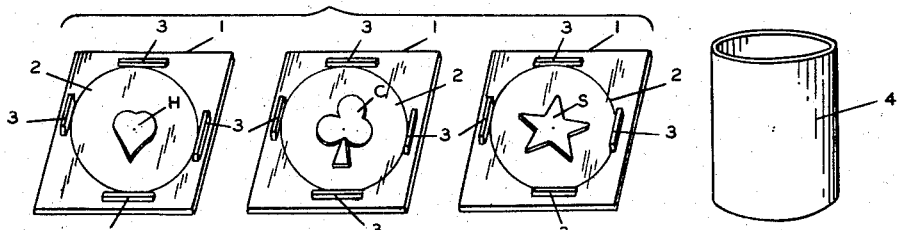
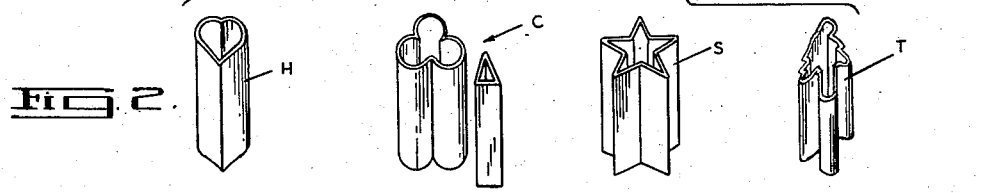
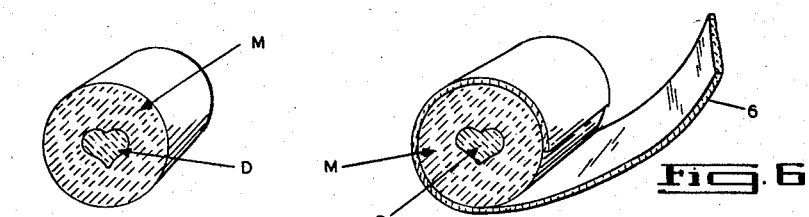
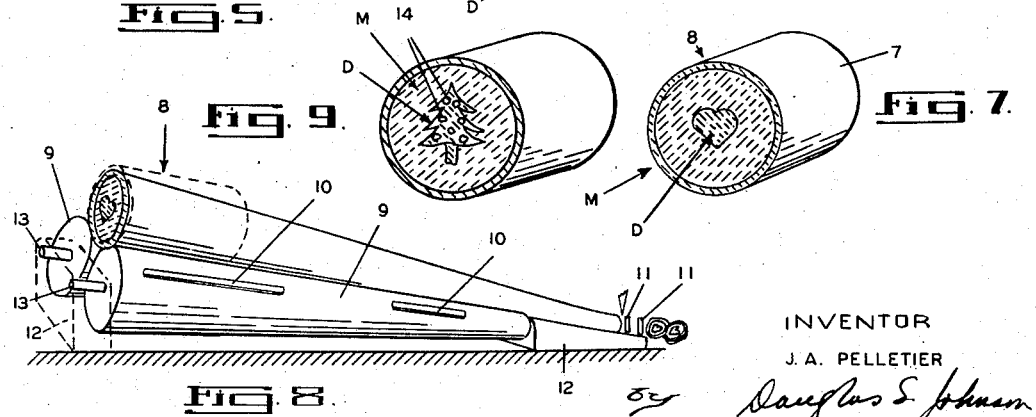
INVENTOR
J. A. PELLETIER
ATTY.

United States Patent Office 2,874,649
Patented Feb. 24, 1959

2,874,649

PROCESS FOR PRODUCING CANDIES WITH INSET DESIGNS

Joseph A. Pelletier, Montreal, Quebec, Canada, assignor to Allen-Crawford Limited Application December 17, 1956, Serial No. 628,750

8 Claims. (Cl. 107—54)

This invention relates to improvements in the manufacture of candy, and more particularly to the production of candy embodying desired inset designs.

In the past it has been proposed to produce candy into which a design has been worked to attract the purchaser, but heretofore the incorporation of such designs has required both slow hand production and skilled artistry on the part of the worker, resulting in a relatively expensive candy product as well as limiting the type and scope of the design to the skill of the worker.

It is the object of this invention to enable the economical production in commercial quantities of candy incorporating inset or central designs.

In this connection it is an important object to eliminate the necessity of any artistic skill previously required on the part of the worker in producing the candy.

Another important object is to enable candy to be produced as aforesaid, which candy can be formed to incorporate substantially any desired design irrespective of its complexity or intricacy.

The invention resides in molding the candy design in an enlarged form within a surrounding candy matrix by means of rigid mold forms whereby the design details can be accurately reproduced, then after the candy has cooled to a state where there will be no free interflow between the central design and surrounding matrix and while the candy is still readily malleable, removing the rigid mold forms and elongating the resulting candy form to reduce its cross-section until the desired design dimensions are achieved, then cutting the elongated candy form transversely into sections of desired thickness for display and packaging.

The method is predicated on the fact that it has been found that the design details produced in the enlarged form of the design and the centralized portion of the design can be substantially maintained during elongation of the original molded candy form. In this connection, to provide symmetrical forces on the candy form during elongation, it is elongated on a conical shaper in which the conical rolls are rotated first in one direction and then the other for substantially equal periods of time.

To further enhance the appearance of the candy and to additionally constrain the centralized design through the elongation of the molded form, the form is preferably wrapped in a candy jacket before elongation.

It will be understood that the jacket, matrix and central design may be made of any suitable candy material such as toffee, nougat, hard spun or clear candy or the like, and may be made in any suitable contrasting colours to enhance the design. Further, the complexity of the design will be limited only by the limitation of intricacy that may be incorporated in the enlarged form of the molds producing the initial candy form.

These and other objects and features of the present invention will become apparent from the following detailed description, in which:

Figure 1 is a perspective view illustrating in perspective a plurality of base plates or mold pallets used for producing candy with different designs in accordance with the invention;

Figure 2 is a perspective view illustrating a plurality of inner mold parts for use with corresponding base plates such as shown in Figure 1;

Figure 3 is a perspective view illustrating the outer cylindrical mold part for use with the several base plates of Figure 1 in accordance with the invention;

Figure 4 illustrates in perspective the application of the mold parts such as disclosed in Figures 1 to 3 in the formation of a composite candy block to incorporate on an enlarged scale the desired central design;

Figure 5 illustrates a typical composite block produced by the mold forms of Figures 1 to 3;

Figure 6 shows a further step in the production of the candy in which the composite block of Figure 5 is being rolled in a candy jacket;

Figure 7 illustrates in perspective the resultant composite block following the step of Figure 6;

Figure 8 illustrates the step of elongating the block of Figure 7 to reduce its cross-section while maintaining the configuration of the centralized design;

Figure 9 is a plan view of the composite candy block produced by the right hand mold of Figure 4 in which candy inserts have been incorporated.

With reference to Figure 1, there is shown a plurality of base plates or pallets 1 which are provided centrally with the desired design to be incorporated in the final candy product. In the illustration, the designs shown comprise a heart $h$, a club $c$, and a star $s$. It will be understood that there is substantially no limitation to the configuration or intricacy of the design, and the designs $h$, $c$, and $s$ are by way of illustration only.

These designs are formed as projecting bosses and form the means of locating and locking the respective design molds such as the molds H, C, and S in position on the base plate. Thus, for example, the relieved design $h$ on the respective base plate 1 will project into the lower end of the corresponding design mold H as shown in Figure 4 to lock this mold in an upright correctly centered position.

Each of the base plates 1 has a circular outline 2 scribed thereon, the outline being of approximately twice the diameter of the major dimension of the central design.

Surrounding the circular formation 2 are projecting lock ribs 3. An outer mold 4, Figure 3, is provided for use in conjunction with each of the inner molds H, C, and S, and this outer mold is of cylindrical formation and is adapted to seat down within the lock ribs 3 in registration with the circular formation 2 on the base plate, being locked in an upright position surrounding the respective inner mold by the lock ribs 3, as illustrated in Figure 4, for instance, where the outer mold 4 is shown as surrounding the inner mold H.

In using the mold parts 1, 4, and, for instance, H in carrying out the process, the inner mold H may be first filled with a suitable candy material 5 as indicated in Figure 4 before the outer mold 4 is assembled in position. The candy material 5 may be of any suitable candy substance, and may be of any desired colour. For instance, the inner mold H may be filled with brightly coloured nougat or toffee candy, or alternatively, may be filled with a licorice or black toffee. The consistency of the candy 5 will be such that it will fill and intimately conform to the configuration of the inner mold H.

As illustrated in Figure 4, the outer mold 4 may then be placed in position as held by the lock ribs 3. This outer mold may then be filled, again with any suitable substance, such as coloured nougat or toffee, hard spun or clear candy or the like, which preferably is of a colour contrasting sharply with the colour of the candy material used to fill the inner mold H. Again, the candy material will be introduced into the outer mold 4 while of a consistency such that it will fill the outer mold and intimately conform around the inner mold H. The consistency of the candy material within both the inner and outer molds may be controlled by heating or cooling to the requisite temperature for handling.

While, in the above described steps, the order of molding of the composite candy form or cylinder comprising the central design core outlined by the inner mold H and the surrounding matrix defined by the outer mold 4 is such as to first produce the inner core design D and then the surrounding matrix M, it will be understood that these steps may be reversed if desired.

When both the inner design D and outer matrix M have been poured, and while the candy material within the molds H and 4 is still in a plastic state, the inner mold H is quickly withdrawn, this being readily accomplished by simply pulling on the mold, allowing the central or core design D to seal itself to the surrounding matrix M. It will be appreciated that the candy material making up the central core D and the matrix M must first, before mold H is removed, be allowed to harden sufficiently so that the design will not flow into and permeate through the surrounding matrix or background material M. On the other hand, the candy material making up the design D and matrix M must not be allowed to harden to the extent that the design will not seal itself to the matrix. Since the candy material must therefore have a relatively high degree of plasticity at the time the inner mold H is removed, the outer mold is left in place to conform the shape of the composite candy cylinder until further hardening has occurred by cooling or allowing the candy material to cool.

When the composite candy cylinder is capable of holding substantially its molded shape it is removed from the outer mold 4 and the base plate 1 as illustrated in Figure 5. Preferably the composite cylindrical block is then wrapped in a strip of candy, such as toffee 6 as illustrated in Figure 6, to provide in the completed candy block a central core presenting the desired design D, a surrounding background or matrix M encircled by a jacket 7.

The resultant composite candy block of Figure 7, generally designated at 8, has the desired appearance of the ultimate candy product, but on a very enlarged scale.

Following the binding of the composite candy block 8 the block is placed on conical rolls 9 of a conical batch roller mechanism of conventional form. The conical batch rollers 9 which may be of the order of, for instance, 6 feet in length, are arranged in side by side relation, and the composite candy block 8 is placed therebetween as shown in Figure 8 in dotted outline. The rolls 9 are first driven in a clockwise direction, and then subsequently reversed and driven in an anti-clockwise direction. It has been found convenient to turn the rolls 9 in the one direction for approximately 15 seconds, and then to turn them in the reverse direction for the same period, this alternate rotation of the rolls continued as long as required.

The rolls 9 are formed preferably with ribs 10 thereon, and as rotation occurs, the cylindrical block 8 is gradually reduced in diameter and elongated as illustrated in solid line in Figure 8, until emerging from the end of the batch rollers, it has a diameter according to that desired in the final candy product.

The cylindrical candy form coming off the rolls 9 may be conveniently cut or sliced perpendicular to the axis of the elongated candy form, and the cylindrical candy slices 11 thus produced may be wrapped in any desired manner.

It has been found that under the action of the conical rollers the elongation of the block 8 and the reduction of its diameter takes place symmetrically throughout the block, so that the central or core design D is maintained centrally within the block and the proportions of the design are symmetrically reduced in accordance with the proportions of the whole block so that the reduced candy form 11 coming off the rolls in Figure 8 is substantially identical with, and a miniature of, the shape and design of the original block 8.

The rolls 9 may be supported by means of any suitable supports 12 and may be driven through drive shafts 13 from any suitable drive, not shown.

Because the composite candy block 8 is of a substantial size prior to its elongation and reduction of diameter in the step illustrated in Figure 8, the design D has a substantial cross-sectional area, and consequently a substantial perimeter. This fact enables complex intricate designs to be created with inner mold forms which, because of their size, are practical to construct and to fill. On reduction of the composite block, the essentials of such intricate or detailed core designs can still be maintained despite the fact that it would be impossible to mold such designs directly in their reduced configuration. In this connection, the process lends itself to the manufacture of candy for special occasions.

Thus, for instance, as illustrated by the right hand mold of Figure 2, the inner mold may be in the form or outline of a Christmas tree T. Again, as illustrated in Figure 4, suitable material, such as toffee or nougat, may be molded within the mold T. Then, around this core candy substance of a suitable contrasting colour is molded to provide a central design core in the form of a Christmas tree surrounded by a contrasting matrix or background.

To further augment the ornamentation effected by the inclusion of the central design T, the candy mass included within the inner mold T may be pierced by a suitable instrument, such as an awl or pick, and rods of contrasting colour such as indicated at 14 in Figures 4 and 9 inserted into the openings formed by the instrument to produce "ornaments" on the tree. It will be understood that the candy mass within the inner mold T will be pierced while still in a relatively plastic state and the rod inserts 14 may be somewhat harder than the mass of candy within the mold T to facilitate their insertion into the opening provided by the penetrating instrument. However, the candy mass within the inner mold T should be maintained with sufficient plasticity to unite with the insert rods 14, and therefore the candy inserts 14 must be quickly placed or injected into the openings provided before the openings close.

Again, on removal of the composite candy block 8, shown in Figure 9, it may first be wrapped in a suitable jacket after which it will be subjected to the elongating and diameter reducing action of the conical batch rollers 9, as explained above, to reproduce the details of the design, including the placement of the "ornaments" in the ultimate candy product.

It will be understood that the inclusion of similar inserts in the matrix or background M may also be provided to give any desired design effect. In the production of the heart design, using the inner mold H, and in the production of the star design, using the inner mold S, a single inner mold form is employed as illustrated particularly in Figure 2. In forming the club design a composite mold form comprising a body portion and a tail portion making up the mold C is provided. It will be understood, however, that the club design could also be formed by a single piece mold. The mold T, for producing the Christmas tree design, is shown as a single mold, but it may be formed as a complex mold as well. Also, molds of multiple components may be employed as the central design mold form in the carrying out of the invention.

Again, because of the initial enlarged size in which the design is created in forming the composite candy block 8, such composite or complex multiple molds may be worked with conveniently in the production of the desired design.

It will be understood that various modifications in the

What I claim as my invention is:

1. A process for producing candy incorporating an inset design, comprising molding a candy core having a cross-section corresponding to but comprising an enlargement of the desired ultimate inset design, intimately surrounding and supporting the candy core with a candy matrix while conforming the periphery of the surrounding matrix to a cylindrical form, and while the candy is in a plastic state, elongating the cylindrical composite candy form formed by the matrix and core to reduce the design cross-section by rolling said composite form first in one direction and then in the other direction to maintain the design configuration on elongation, and subsequently slicing the elongated composite candy form.

2. A process as claimed in claim 1 in which the core and matrix are formed of candy of different colours.

3. A process for producing candy incorporating an inset design, comprising molding candy material to produce a composite cylindrical candy block comprising a central core having a cross-section of a desired design configuration surrounded by a supporting matrix providing a transition from the configuration of the core design to the cylindrical form of said block, the core and matrix being of different colours, then wrapping the composite cylindrical candy block in a candy jacket, then elongating the wrapped composite cylindrical candy block to reduce the cross-section thereof by rolling said composite form first in one direction and then the other direction to maintain the design configuration of said core on elongation, and then slicing the elongated candy block transversely of its length.

4. A process for producing candy incorporating a desired inset design comprising molding candy while in a plastic state to produce a composite cylindrical candy form comprising a central core having a cross-section shaped to correspond to and constituting an enlargement of the desired design and a surrounding matrix block having a circular periphery, and while the candy is in a plastic state, rolling said cylindrical composite candy form about its axis first in one direction and then in the opposite direction to elongate said composite form and symmetrically reduce its cross-section, then transversely slicing the elongated composite candy form.

5. A process for producing candy incorporating a desired inset design comprising molding candy while in a plastic state to form a candy core within a central rigid mold form having a cross-section shaped to correspond to and constituting an enlargement of the desired design, and molding a surrounding candy matrix within a surrounding rigid mold form to produce a cylindrical outer matrix surface, removing the mold forms while the candy has a consistency such that it is capable of maintaining substantially its molded shape, but having sufficient plasticity to unite the core and surrounding matrix to provide a composite candy block providing a transition from the design configuration of the central core to a cylindrical block form, then elongating the cylindrical composite plastic candy block to reduce its cross-section by rolling said composite form first in one direction and then the other direction to maintain the design configuration of said core on elongation, and transversely cutting said elongated candy block.

6. A process as claimed in claim 5 in which said composite candy block is wrapped in a jacket prior to elongation.

7. A process for producing candy discs having a centralized design within a surrounding border, said process comprising erecting from a base an elongated inner mold having a cross-section, the outline of which corresponds to the desired design and the dimensions of which are substantially greater than the ultimate candy discs to be produced, erecting from said base an elongated cylindrical outer mold arranged to encircle the inner mold, introducing candy of contrasting colours while in a plastic state into said molds and, while the candy is still plastic, removing said inner mold to allow the central design to affix itself to the surrounding candy matrix to provide a composite candy cylinder with said matrix providing a transition from the configuration of said central design to the cylindrical form of said composite candy cylinder, then removing the composite candy cylinder from the outer mold and base, rolling said composite cylinder about its axis first in one direction and then the opposite direction to elongate same, the rolling in said opposite directions being carried out for substantially the same length of time, thereby symmetrically reducing the cross-section while maintaining the central disposition of said design, then transversely slicing the elongated reduced cross-section composite cylinder to form individual discs having centrally therein a miniature of the outline of the said inner mold.

8. A process as claimed in claim 7 in which elongated plastic candy rod members are inserted into one of the central design and surrounding portions of the composite candy cylinder prior to elongation.

References Cited in the file of this patent
UNITED STATES PATENTS

| Number | Name | Date |
|---|---|---|
| 18,541 | Gardner | Nov. 3, 1857 |
| 279,131 | Chase | June 12, 1883 |
| 498,142 | Thoens | May 23, 1893 |
| 755,343 | Barratt | Mar. 22, 1904 |
| 763,732 | Dickson | June 28, 1904 |
| 1,566,329 | Laskey | Dec. 22, 1925 |
| 1,628,251 | Laskey | May 10, 1927 |
| 1,667,335 | Varkas et al. | Apr. 24, 1928 |
| 2,015,097 | Bowman et al. | Sept. 24, 1935 |
| 2,559,648 | Lindhe | July 10, 1951 |